(12) United States Patent
Miyanishi et al.

(10) Patent No.: US 8,980,022 B2
(45) Date of Patent: Mar. 17, 2015

(54) CASE HARDENING STEEL, CARBURIZED COMPONENT, AND MANUFACTURING METHOD OF CASE HARDENING STEEL

(75) Inventors: Kei Miyanishi, Tokyo (JP); Masayuki Hashimura, Tokyo (JP); Shuuji Kozawa, Tokyo (JP); Manabu Kubota, Tokyo (JP); Tatsuro Ochi, Tokyo (JP)

(73) Assignee: Nippon Steel & Sumitomo Metal Corporation, Tokyo (JP)

( * ) Notice: Subject to any disclaimer, the term of this patent is extended or adjusted under 35 U.S.C. 154(b) by 740 days.

(21) Appl. No.: 13/061,023

(22) PCT Filed: Jan. 13, 2010

(86) PCT No.: PCT/JP2010/000140
§ 371 (c)(1),
(2), (4) Date: Feb. 25, 2011

(87) PCT Pub. No.: WO2010/082481
PCT Pub. Date: Jul. 22, 2010

(65) Prior Publication Data
US 2011/0155290 A1    Jun. 30, 2011

(30) Foreign Application Priority Data
Jan. 16, 2009 (JP) .................. 2009-008174

(51) Int. Cl.
*C21D 9/52* (2006.01)
*C21D 8/02* (2006.01)
*C21D 9/00* (2006.01)
*C22C 38/08* (2006.01)
*C22C 38/44* (2006.01)
(Continued)

(52) U.S. Cl.
CPC . *C22C 38/02* (2013.01); *B21J 1/02* (2013.01); *C21D 6/002* (2013.01); *C21D 8/0205* (2013.01); *C21D 8/0226* (2013.01); *C21D 8/0257* (2013.01); *C21D 9/32* (2013.01); *C21D 9/36* (2013.01); *C21D 9/38* (2013.01); *C21D 9/40* (2013.01); *C22C 38/001* (2013.01); *C22C 38/002* (2013.01); *C22C 38/04* (2013.01); *C22C 38/06* (2013.01); *C22C 38/28* (2013.01); *F16C 33/62* (2013.01); *C21D 1/32* (2013.01); *C21D 1/58* (2013.01); *C21D 2211/005* (2013.01)
USPC ........... 148/598; 148/595; 148/579; 148/559; 148/336; 148/335; 148/334; 148/333; 148/320; 148/318; 148/317; 148/316

(58) Field of Classification Search
None
See application file for complete search history.

(56) References Cited

FOREIGN PATENT DOCUMENTS

| JP | 8-295981 A | 11/1996 | |
|---|---|---|---|
| JP | 08-311607 | * 11/1996 | .............. C22C 38/00 |

(Continued)

OTHER PUBLICATIONS

English translation of Murai, JP 08-311607 (1996).*
(Continued)

*Primary Examiner* — Yoshitoshi Takeuchi
(74) *Attorney, Agent, or Firm* — Birch, Stewart, Kolasch & Birch, LLP (57) ABSTRACT

This case hardening steel has a chemical composition including, by mass %: C: 0.1 to 0.6%; Si: 0.02 to 1.5%; Mn: 0.3 to 1.8%; P: 0.025% or less; S: 0.001 to 0.15%; Al: over 0.05 to 1.0%; Ti: 0.05 to 0.2%; N: 0.01% or less; and O: 0.0025% or less, and further including, by mass %, one or more of Cr: 0.4 to 2.0%, Mo: 0.02 to 1.5%, Ni: 0.1 to 3.5%, V: 0.02 to 0.5%, and B: 0.0002 to 0.005%, and the balance consisting of iron and unavoidable impurities.

3 Claims, 1 Drawing Sheet (51) Int. Cl.
*C22C 38/22* (2006.01)
*C22C 38/00* (2006.01)
*C23C 8/32* (2006.01)
*C23C 8/26* (2006.01)
*C23C 8/30* (2006.01)
*C23C 8/24* (2006.01)
*C23C 8/20* (2006.01)
*C22C 38/02* (2006.01)
*B21J 1/02* (2006.01)
*C21D 6/00* (2006.01)
*C21D 9/32* (2006.01)
*C21D 9/36* (2006.01)
*C21D 9/38* (2006.01)
*C21D 9/40* (2006.01)
*C22C 38/04* (2006.01)
*C22C 38/06* (2006.01)
*C22C 38/28* (2006.01)
*F16C 33/62* (2006.01)
*C21D 1/32* (2006.01)
*C21D 1/58* (2006.01)

(56) References Cited

FOREIGN PATENT DOCUMENTS

| | | | | |
|---|---|---|---|---|
| JP | 10-121193 | * | 5/1998 | ............ C22C 38/00 |
| JP | 11-92824 A | | 4/1999 | |
| JP | 11-092863 A | | 4/1999 | |
| JP | 11-106866 A | | 4/1999 | |
| JP | 11-131184 A | | 5/1999 | |
| JP | 2000-87179 A | | 3/2000 | |
| JP | 2001-152280 A | | 6/2001 | |
| JP | 2001-220645 A | | 8/2001 | |
| JP | 2002-69573 A | | 3/2002 | |
| JP | 2002-180184 A | | 6/2002 | |
| JP | 2003-34843 A | | 2/2003 | |
| JP | 2004-244705 | * | 9/2004 | ............ C22C 38/00 |
| JP | 2005-240175 A | | 9/2005 | |
| JP | 2006-161144 A | | 6/2006 | |
| JP | 2006-307273 A | | 11/2006 | |
| JP | 2007-31787 A | | 2/2007 | |
| WO | WO 02/44435 A1 | | 6/2002 | |

OTHER PUBLICATIONS

English translation of JP 2004-244705.*
International Search Report, dated Apr. 20, 2010 issued in PCT/JP2010/000140.

* cited by examiner

CASE HARDENING STEEL, CARBURIZED COMPONENT, AND MANUFACTURING METHOD OF CASE HARDENING STEEL

BACKGROUND OF THE INVENTION

1. Field of the Invention

The present invention relates to a case hardening steel superior in property of preventing coarse grains at the time of carburizing and in fatigue property, and a manufacturing method thereof.

Priority is claimed on Japanese Patent Application No. 2009-008174, filed on Jan. 16, 2009, the contents of which are incorporated herein by reference.

2. Description of Related Art

For gears, bearing components, rolling components, shafts, and constant velocity joints, a medium carbon alloy steel for machine structural purposes, as defined, for example, in JIS G 4052, JIS G 4104, JIS G 4105, JIS G 4106, or the like in Japanese Industrial Standards (JIS), is typically used. These components are typically manufactured through steps of being worked into a predetermined shape by cold forging (including rolling) or hot forging, and cutting, and then carburizing and quenching. In cold forging, products have a good surface and dimensional accuracy, and manufacturing costs are lower than that in hot forging, and yielding is favorable. Consequently, there is an increasing tendency to use cold forging to manufacture components that have been conventionally manufactured by hot forging. As a result, carburized components manufactured in steps of cold forging and carburizing has obtained significantly wider applications and uses in these years. An important challenge in the manufacture of carburized components is how to decrease distortion in heat treatment. A solution to this problem is required for example, in the following cases. In the case of applying a carburized component to a shaft, if a bending deformation happened to the shaft by heat treatment distortion, the function of component as a shaft is impaired. Furthermore, in the case of applying a carburized component to a gear or a constant velocity joint component, an increase in heat treatment distortion leads to a cause of noise or vibration. Here, the greatest cause of heat treatment distortion produced in a carburized component is coarse grains produced at the time of carburizing. To suppress coarse grains produced at the time of carburizing, annealing is conventionally performed after cold forging, before carburizing and quenching. However, particularly in recent years, there is an increasing tendency toward omission of annealing in terms of cost reduction. Therefore, there is a strong demand for a steel material that will not produce coarse grains in a carburized component even in the case where annealing is omitted.

On the other hand, among the gears, bearing components, and rolling components, the bearing components and rolling components on which a high surface pressure is loaded are subjected to a deep carburizing. Deep carburizing requires a long period of time, typically ten and some hours to tens of hours. Therefore, in terms of reducing energy consumption, shortening of the carburizing time is an important challenge. For shortening the carburizing time, increase in carburizing temperature and increase in carbon amount of the base material before carburizing are effective. The typical carburizing temperature is approximately 930° C. If a so-called high-temperature carburizing is performed in a temperature range of 990 to 1090° C., there arises a problem in that coarse grains are produced, and it becomes unable to obtain required fatigue properties, rolling contact fatigue properties, and the like. Therefore, there is a demand for a case hardening steel which does not produce coarse grains even in high-temperature carburizing, that is, a case hardening steel suitable for high-temperature carburizing. For example, to obtain the same effective case depth as that at the time of regular carburizing, the carburizing time is expected to be shortened by using the base material having a higher carbon content before carburizing, i.e., 0.2% to 0.3% of C, as for the level of regular hardening steel level.

In particular, many of the gears, bearing components, and rolling components on which a high surface pressure is loaded are offered as large-size components, and are typically manufactured through the steps of "steel bar, hot forging, heat treatment such as normalizing, if required, cutting, carburizing and quenching, and polishing if required." To suppress production of coarse grains at the time of carburizing, it is necessary to achieve a material quality suitable for suppressing coarse grains in a state after hot forging, that is, in a state of a hot forged member. To do so, it is required to achieve a material quality suitable for suppressing coarse grains in a state of a base material for a steel bar or wire rod.

As a technique for stably suppressing coarse grains in conventional case hardening steel, there is disclosed a case hardening steel that includes predetermined amounts of Al and N and is excellent in property of preventing coarse grains in which the state of a ferrite band of a structure in a cross-section parallel to the hot rolling direction is appropriately regulated (for example, see Japanese Unexamined Patent Application, First Publication No. H11-106866, hereinafter Patent Document 1). However, as for the disclosed technique in Patent Document 1, there are actually cases where components manufactured through the steps of spheroidizing annealing and cold forging are not stably exerting effects of suppressing coarse grains. Furthermore, also in high-temperature carburizing, there are actually cases where it is not able to suppress production of coarse grains.

Furthermore, Japanese Unexamined Patent Application, First Publication No. H11-92863 (hereinafter Patent Document 2) discloses a manufacturing method of a case hardening steel in which a steel material including, by mass %, Ti: 0.10 to 0.30% and N: less than 0.01% in addition to predetermined amounts of C, Si, or the like is used, and in which hot rolling heating for a slab is performed within a temperature range of 1250 to 1400° C. and also rolling heating for a product is performed at a temperature of Ac3 to 1050° C. Furthermore, Japanese Unexamined Patent Application, First Publication No. H11-92824 (hereinafter Patent Document 3) discloses a technique of improving a rolling contact fatigue life and rotating bending fatigue life by finely dispersing Ti carbides in a case hardening steel having similar compositions to those of Patent Document 2.

Furthermore, in Japanese Unexamined Patent Application, First Publication No. 2003-34843 (hereinafter Patent Document 4), there is disclosed a high-strength case hardening steel that includes, by mass %, Ti: over 0.1 to 0.2% and N: 0.015% or less in addition to predetermined amounts of C, Si, or the like and is made of a martensitic structure in which a prior austenite grain size is refined to standard No. 11 of JIS G0551 or further. Furthermore, there is disclosed a high-strength case hardening steel that includes, by mass %, N: 0.020% or less and includes one or more of "Ti: 0.05 to 0.2%, V: 0.02 to 0.10%, and Nb: 0.02 to 0.1%," and is made of a martensitic structure in which a prior austenite grain size is refined as No. 11 of JIS G0551 or further.

Furthermore, Japanese Unexamined Patent Application, First Publication No. 2005-240175 (hereinafter Patent Document 5) discloses a case hardening steel that is excellent in property of preventing coarse grains during carburizing and in fatigue property, in which the case hardening steel includes, by mass %, Ti: 0.05 to 0.2% and a specific range of another specific component, and N is limited to less than 0.0051% by mass %; or in which the case hardening steel further includes Nb: less than 0.04% by mass % and an amount of precipitates of AlN after hot rolling is limited to 0.01% or less, or in which a structural fraction of bainite after hot rolling is further limited to 30% or less, or in which the ferrite grain size index after hot rolling is further limited to any of No. 8 to No. 11 as defined in JIS G0552, or in which a maximum diameter of Ti-based precipitates of a matrix of a steel after hot rolling in a cross-section in a longitudinal direction is further limited to 40 µm or less, the maximum diameter being obtained by extreme value statistics measured under the following conditions.

However, the coarse grain preventive steel into which an abundance of Ti is doped as shown in the aforementioned Patent Documents 1 to 5 have a problem in that the abundant doping of Ti degrades machinability. Major causes of the degradation in machinability are: 1) an increase in hardness of the base material and 2) a decrease in MnS that has a strong effect of improving machinability, due to production of Ti-based nitrides. With these causes, for example a tool used for working on steel is likely to be damaged, resulting in a problem of machining being made less easy, or the like, that is, the machinability is degraded.

Furthermore, as for methods of shortening the time for carburizing, there exits an increase in carburizing temperature and also an increase in carbon content in the base material before carburizing. However, n this latter case, degradation in machinability resulting from an increase in hardness of the base material is a problem.

SUMMARY OF THE INVENTION

In the aforementioned techniques disclosed in Patent Documents 1 to 5, an abundance of Ti is doped in order to prevent coarse grains produced at the time of carburizing. However, as a result, a problem of degraded machinability is posed, making it difficult for such techniques to be applied to industrial use. On the other hand, in the case of increasing the carbon amount in base materials for shortening the carburizing time, there is apprehension that further degradation in machinability will be caused. Therefore, it is difficult for the techniques to be applied in an actual use. The present invention solves such problems, and provides a case hardening steel in which heat treatment distortion is small, is excellent in property of preventing coarse grains at the time of carburizing, and is excellent in fatigue property.

The present invention, which is based on novel knowledge described in the present specification, is a case hardening steel excellent in property of preventing coarse grains at the time of carburizing and in fatigue property. The scope of the present invention is as follows.

(1) A case hardening steel according to one aspect of the present invention has a chemical composition including, by mass %: C: 0.1 to 0.6%; Si: 0.02 to 1.5%; Mn: 0.3 to 1.8%; P: 0.025% or less; S: 0.001 to 0.15%; Al: over 0.05 to 1.0%; Ti: 0.05 to 0.2%; N: 0.01% or less; and O: 0.0025% or less, and further including, by mass %, one or more of Cr: 0.4 to 2.0%, Mo: 0.02 to 1.5%, Ni: 0.1 to 3.5%, V: 0.02 to 0.5%, and B: 0.0002 to 0.005%, and the balance consisting of iron and unavoidable impurities.

(2) In the case hardening steel according to the above (1) the chemical composition thereof may further include, in mass %, Nb: less than 0.04%.

(3) In the case hardening steel according to the above (1) or (2), a structural fraction of bainite after hot rolling may be 30% or less.

(4) In the case hardening steel according to the above (1) or (2), a ferrite grain size index after hot rolling may be any of No. 8 to 11 defined in JIS G0552.

(5) In the case hardening steel according to the above (1) or (2), a maximum diameter of Ti-based precipitates in a cross-section along longitudinal direction in a matrix of the steel after hot rolling may be 40 µm or less.

(6) A carburized component according to one aspect of the present invention includes the case hardening steel according to the above (1) or (2), which is worked into a component shape.

(7) A manufacturing method of a case hardening steel according to one aspect of the present invention includes, preparing a steel whose chemical composition includes, by mass %: C: 0.1 to 0.6%; Si: 0.02 to 1.5%; Mn: 0.3 to 1.8%; P: 0.025% or less; S: 0.001 to 0.15%; Al: over 0.05 to 1.0%; Ti: 0.05 to 0.2%; N: 0.01% or less; and O: 0.0025% or less, and further includes, by mass %, one or more of Cr: 0.4 to 2.0%, Mo: 0.02 to 1.5%, Ni: 0.1 to 3.5%, V: 0.02 to 0.5%, and B: 0.0002 to 0.005%, and the balance consisting of iron and unavoidable impurities; and heating the steel at a temperature of 1150° C. or higher for 10 minutes or longer and hot-rolls the steel into a wire rod or a steel bar.

(8) In the manufacturing method of a case hardening steel according to the above (7), the steel whose chemical composition further includes, by mass %, Nb: less than 0.04% may be used.

(9) In the manufacturing method of a case hardening steel according to the above (7) or (8), the steel may be gradually cooled, after the hot rolling, in a temperature range of 800 to 500° C. at a cooling rate of 1° C./second or less, and a structural fraction of bainite of the steel after hot rolling may be 30% or less.

(10) In the manufacturing method of a case hardening steel according to the above (7) or (8), a finishing temperature of hot rolling may be 840 to 1000° C., and a ferrite grain size index of the steel after hot rolling may be any of No. 8 to 11 defined in JIS G0552.

ADVANTAGES OF THE INVENTION

According to the case hardening steel of the above (1), the carburized component of the above (6), and the manufacturing method of a case hardening steel of the above (7), even if a component is manufactured in a cold forging step, coarsening of the grains at the time of carburizing is suppressed. Therefore, it is possible to improve the fatigue strength property. In addition to this, it is possible to significantly reduce the degradation in dimensional accuracy by quenching distortion compared with conventional cases. This enables cold forging of components which have had difficulty in being cold forged due to the problem of coarse grains, and also enables omission of annealing after cold forging. Furthermore, even when the present steel material is applied to components manufactured through a hot forging step, it is possible to prevent production of coarse grains also in high-temperature carburizing, to thereby obtain sufficient strength properties such as a rolling contact fatigue property. Furthermore, also as for cutting workability, a favorable machinability can be exerted with a case hardening steel according to the present invention, and hence, it is possible to obtain favorable cutting workability.

EMBODIMENTS OF THE INVENTION

To solve the aforementioned problems, the present inventors have intensively researched on dominant factors for coarsening of grains and in methods of improving degradation in machinability due to doping of abundant Ti for suppressing the coarsening, and have clarified the following points.

(1) In order to prevent coarsening of grains at the time of carburizing, it is more effective to finely precipitate Ti-based precipitates mainly composed of TiC, TiCS at the time of carburizing than to utilize AlN and NbN as pinning particles. In addition to this, a property of preventing coarse grains is further improved by finely precipitating carbonitrides of Nb mainly composed of NbC at the time of carburizing.

(2) In order to stably exert a pinning effect of Ti-based precipitates or, furthermore, precipitates of NbC in a method of finely precipitating the Ti-based precipitates or additionally the carbonitrides of Nb at the time of carburizing, it is required to finely precipitate these precipitates previously in the matrix in a post-hot-rolling stage, which is a stage prior to carburizing. To do so, it is required to cause the precipitates to interphase-precipitate at the time of diffusion transformation from austenite in a cooling process at the time of hot rolling. If bainite is produced in the same structure as in the hot rolling, it becomes difficult for the above precipitates to interphase-precipitate. Therefore, it is essential to form a structure that does not substantially include bainite.

(3) To finely precipitate Ti-based precipitates or additionally precipitates of NbC previously in a steel material after hot rolling, a rolling heating temperature and a cooling condition after rolling may be optimized. That is, by elevatiing rolling heating temperature, Ti-based precipitates or additionally precipitates of NbC is once incorporated into the matrix as solid solute, and by then gradually cooling it in the temperature range for precipitating Ti-based precipitates or additionally precipitates of NbC after hot rolling, it is possible to disperse these carbonitrides abundantly and finely.

(4) Furthermore, if ferrite grains in the steel material after hot rolling are excessively refined, coarse grains are likely to be produced at the time of carburizing heating. Therefore, it is important to optimize a roll finishing temperature.

(5) In Ti-doped steel, a Ti-based precipitate functions as a starting point of fatigue fracture. Therefore, a fatigue property, and in particular, a rolling contact fatigue property is likely to be degraded. However, it is possible to improve a fatigue property by making the maximum size of Ti-based precipitates smaller through a lowered N amount, elevated temperatures for hot rolling, or the like. In this case, it is possible to obtain both of a property of preventing coarse grains and a fatigue property.

(6) Furthermore, with the Al amount being adjusted to over 0.05 to 1.0% for sufficiently securing the solute Al amount that contributes to improvement in machinability, it is possible to improve machinability.

As a related known technology, in the case where doping of abundant Ti and doping of Al are performed separately, it is known that each doping may have an adverse influence on machinability.

An influence of doping of Al on machinability is described in, for example, Japanese Unexamined Patent Application, First Publication No. 2000-87179 (hereinafter Patent Document 6), Japanese Unexamined Patent Application, First Publication No. 2001-152280 (hereinafter Patent Document 7), Japanese Unexamined Patent Application, First Publication No. 2001-220645 (hereinafter Patent Document 8), and Japanese Unexamined Patent Application, First Publication No. 2002-180184 (hereinafter Patent Document 9). In Patent document 7, there is a description to the effect that, if 0.05% or more of Al is included, machinability is decreased as a result of an increase in amount of alumina-based oxides.

The present invention is based on a new technological idea that overturns such conventional common knowledge. As will be described in detail later, in the conditions of the present invention, even if 0.05% or more of Al is doped, alumina-based oxides are not necessarily increased, and the doped Al can be kept in a solute state. Therefore, production of oxides of alumina and the like associated with heating at the time of cutting is becomes extremely active. This results in a significantly pronounced effect of a remarkable improvement in machinability.

Hereunder is a detailed description of a case hardening steel excellent in property of preventing coarse grains at the time of carburizing and in fatigue property, as an embodiment of the present invention.

First, reasons for limiting chemical compositions in a hardening steel according to the present invention will be described. Hereinafter, in the description of composition, mass % will be described simply as %.

Carbon (C): 0.1 to 0.6%

C is an element effective for providing steel with a required strength. However, with the C content of 0.1% or less, it is not possible to secure a required tensile strength. With the C content of over 0.6%, the steel becomes hard, resulting in degradation in cold workability and also degraded ductility in the core portion after carburizing. Therefore, it is required that C be within the range of 0.1 to 0.6%.

Silicon (Si): 0.02 to 1.5%

Si is an element effective for deoxidation of steel. It is also an element effective for providing steel with a required strength and hardenability to improve temper softening resistance. With a Si content of less than 0.02%, it is not possible to sufficiently obtain the above effects. On the other hand, a Si content of over 1.5% increases hardness, resulting in degradation of cold forgeability. For the above reason, it is required that the content be within the range of 0.02 to 1.5%. For steel material to be subjected to cold working, a preferable range is 0.02 to 0.3%. If cold forgeability is particularly important, it is desirable that the content be in the range of 0.02 to 0.15%. On the other hand, Si is an element effective for increasing grain boundary strength. In bearing components and rolling components, it is an element effective for causing the durable period longer by suppression of structural change and degradation in material quality in the process of rolling contact fatigue. Therefore, in the case of aiming for higher strength, it is preferable that the content be in the range of 0.2 to 1.5%. In particular, to obtain a high level of rolling contact fatigue strength, it is desirable that the content be in the range of 0.4 to 1.5%. Note that the effect of suppressing the structural change and the degradation in material quality in the process of rolling contact fatigue in the bearing components and rolling components due to doping of Si is particularly great when an amount of retained austenite (commonly referred to as an amount of retained γ) in the structure after carburizing is 30 to 40%. To control the amount of retained γ in this range, it is effective to perform a so-called carbonitriding treatment.

A carbonitriding treatment is a treatment in which nitriding is performed in the process of a diffusion treatment after carburizing. A condition such as to put the nitride concentration on the surface in the range of 0.2 to 0.6% is appropriate. It is desirable that a carbon potential at the time of carburizing for this case be in the range of 0.9 to 1.3%.

Manganese (Mn): 0.3 to 1.8%

Mn is an element effective for deoxidation of steel. It is also an element effective for providing steel with a required strength and hardenability. However, with a Mn content of less than 0.3%, the effects are not sufficient. If the Mn content exceeds 1.8%, not only the effects are saturated, but also cause an increase in hardness, resulting in degradation in cold forgeability. Therefore, the Mn content is required to be within the range of 0.3 to 1.8%. A preferable range is 0.5 to 1.2%. When cold forgeability is considered important, it is desirable that the content be in the range of 0.5 to 0.75%.

Phosphorus (P): 0.025% or less

P is an element for enhancing deformation resistance at the time of cold forging, and hence degrades ductility. Therefore, cold forgeability is degraded. Furthermore, P causes brittle grain boundaries after quenching and tempering, and thereby degrades the fatigue strength. Consequently, it is desirable that P be reduced as much as possible. Therefore, its content is required to be limited to 0.025% or less. A preferable range is 0.015% or less.

Sulfur (S): 0.001 to 0.15%

S is doped for the purpose of forming MnS in steel to improve machinability. However, with a S content of less than 0.001%, the effect is not sufficient. On the other hand, with a S content of over 0.15%, the effect is saturated and rather results in occurrence of grain boundary segregation, leading to a grain boundary embrittlement. For the above reason, the S content is required to be within the range of 0.001 to 0.15%. Note that, in bearing components and rolling components, S is required to be reduced as much as possible because MnS degrades a rolling contact fatigue life. Therefore, it is desirable that the S content be in the range of 0.001 to 0.01%.

Aluminum (Al): over 0.05 to 1.0%

Among Al (the total Al in the steel), part thereof is bound with N to precipitate as AlN, the rest being present as solute Al. The solute Al amount contributes to improvement in machinability. Therefore, the more the amount of the solute Al is, the more desirable. To exert favorable machinability, it is required to secure a sufficient solute Al amount of over 0.05%. On the other hand, with a solute Al amount of over 1.0%, a transformation property is heavily influenced. Therefore, the upper limit of the solute Al amount is 1.0%. More preferably, the solute Al amount is 0.08 to 1.0%. Even more preferably, it is desirable that the solute Al amount be in the range of 0.1% 1.0%.

Titanium (Ti): 0.05 to 0.2%

Ti is doped for producing fine TiC and TiCS in steel, to thereby cause γ grains at the time of carburizing refined and expect an effect of preventing coarse grains. However, with a Ti content of less than 0.05%, the effect is not sufficient. On the other hand, if over 0.2% of Ti is doped, precipitation hardening by TiC becomes significant. As a result, cold workability significantly degrades, and also precipitates mainly composed of TiN become significant, deteriorating a rolling contact fatigue property. For the above reason, its content is required to be within the range of 0.05 to 0.2%. A preferable range of Ti content is 0.05 to less than 0.1%. Note that, in the steel and the hot forging member of the present invention, the solute Ti reacts with the carbon and the nitrogen that intrude into the steel and the hot forging member at the time of carbonitriding heating, to thereby precipitate an abundance of fine Ti(CN) in a carburized case. Therefore, in the bearing components and rolling components, the Ti(CN) contributes to improvement in a rolling contact fatigue life. Consequently, in the bearing components and the rolling components, in the case of aiming for rolling contact fatigue life at a particularly high level, it is effective to set the carbon potential at the time of carburizing to a higher value in the range of 0.9 to 1.3%, or perform a so-called carbonitriding treatment. The carbonitriding treatment is a treatment in which nitriding is performed in the process of a diffusion treatment after carburizing as described above. For this treatment, a condition such as to put the nitrogen concentration on the surface in the range of 0.2 to 0.6% is appropriate. The present inventor has found that, with the Ti content being within the range of 0.05 to 0.2%, MnS is refined and decreased in amount through the production of TiCS, to thereby improve an impact value.

Nitrogen (N): 0.01% or less

If N is bound with Ti in steel, coarse TiN, which hardly contributes to grain control, is produced. The TiN becomes precipitation sites of Ti-based precipitates mainly composed of TiC and TiCS, of NbC, and of Nb(CN) mainly composed of NbC. Therefore, the Ti-based precipitates and fine precipitation of the carbonitride of Nb are rather prohibited. As a result, an adverse influence in which production of coarse TiN promotes production of coarse grains is brought about. The adverse influence based on TiN is significant particularly in the case where the N amount exceeds 0.01%. For the above reason, the content of N is required to be 0.01% or less. More preferably, it is desirable that the content of N be limited to less than 0.0051%.

Oxygen (O): 0.0025% or less

In a high Ti steel such as of the present invention, O forms an oxide-based inclusion in the steel.

If oxide-based inclusions are present in the steel in abundance, the inclusions function as precipitation sites of TiC. As a result, TiC precipitates coarsely at the time of hot rolling, making unable to suppress coarsening of grains at the time of carburizing. Therefore, it is desirable that the O amount be reduced as much as possible. For the above reason, the content of O is required to be limited to 0.0025% or less. A preferable range is 0.0020% or less. Note that, in the bearing components and the rolling components, oxide-based inclusions function as starting points of rolling contact fatigue fracture. Therefore, lower O content causes further rolling life improvement. Consequently, in the bearing components and the rolling components, it is desirable that the O content be limited to 0.0012% or less.

Furthermore, in the present invention, one or more of chromium (Cr), molybdenum (Mo), nickel (Ni), vanadium (V), boron (B) that are defined in the following compositional range are included in the steel material.

Cr: 0.4 to 2.0%

Cr is an element effective for providing steel with strength and hardenability. Furthermore, in the bearing components and rolling components, it is an element effective for increasing an amount of retained γ after carburizing and also for causing the durable period longer by suppression of structural change and degradation in material quality in the process of rolling contact fatigue. With a Cr content of less than 0.4%, the effects are not sufficient. On the other hand, a doping of over 2.0% of Cr causes an increase in hardness, resulting in degradation in cold forgeability. For the above reason, it is preferable that the content be within the range of 0.4 to 2.0%. A more preferable range of the content is 0.7 to 1.6%. Note that the effect of suppressing the structural change and the degradation in material quality in the process of rolling contact fatigue in the bearing components and rolling components due to doping of Cr is particularly great when the amount of retained γ in the structure after carburizing is 30 to 40%. To suppress the amount of retained γ in this range, it is effective to perform a so-called carbonitriding treatment, to thereby put the nitride concentration on the surface in the range of 0.2 to 0.6%.

Mo: 0.02 to 1.5%

Doping of Mo has an effect of providing steel with strength and hardenability. Furthermore, in the bearing components and rolling components, it is an element effective for increasing an amount of retained γ after carburizing and also for causing the durable period longer by suppression of structural change and degradation in material quality in the process of rolling contact fatigue. To obtain the effects, a Mo content of 0.02% or greater is preferable. However, doping of over 1.5% of Mo invites an increase in hardness, resulting in degradation in machinability and cold forgeability. For the above reason, it is preferable that the content be within the range of 1.5% or less. A more preferable range is 0.5% or less. The effect of suppressing the structural change and the degradation in material quality in the process of rolling contact fatigue in the bearing components and rolling components due to doping of Mo is particularly great also when the amount of retained γ in the structure after carburizing is 30 to 40% after a so-called carbonitriding treatment, similarly to the case of Cr.

Ni: 0.1 to 3.5%

Doping of Ni has an effect of providing steel with strength and hardenability. To obtain the effect, a Ni content of 0.1% or greater is preferable. However, doping of over 3.5% of Ni invites an increase in hardness, resulting in degradation in machinability and cold forgeability. For the above reason, it is preferable that the content of Ni be within the range of 3.5% or less. A more preferable range of Ni content is 2.0% or less.

V: 0.02 to 0.5%

Doping of V has an effect of providing steel with strength and hardenability. To obtain the effect, a V content of 0.02% or greater is preferable. However, doping of over 0.5% of V causes an increase in hardness, resulting in degradation in machinability and cold forgeability. For the above reason, it is preferable that the content of V be within the range of 0.5% or less. A more preferable range of A content is 0.2% or less.

B: 0.0002 to 0.005%

Doping of B has an effect of providing steel with strength and hardenability. Furthermore, B also has 1) an effect of producing, in steel bar/wire rod rolling, a boron iron carbide in a cooling process after the rolling, to thereby increase a growth speed of ferrite and promote softening of the steel bar/wire rod in a state of being rolled and 2) an effect of improving a grain boundary strength of a carburized steel, to thereby improve fatigue strength and impact strength as a carburized component. To obtain the effects, a B content of 0.0002% or greater is preferable.

However, doping of over 0.005% of B saturates the effects and rather leads to apprehension of an adverse influence such as degradation in impact strength. Therefore, it is preferable that the content of B be within the range of 0.005% or less. A more preferable range of B content is 0.003% or less.

Next, in one aspect of the present invention, niobium (Nb): less than 0.04% maybe included. An effect of such an aspect will be described below. Nb is an element that is bound with C and N at the time of carburizing heating to form Nb(CN), and hence, is effective for suppressing coarsening of grains. Doping of Nb causes "the effect of preventing coarse grains by Ti-based precipitates" be more effective. This is because Nb incorporates into Ti-based precipitates to suppress coarsening of the Ti-based precipitates. Within the range of the doped amount of the present invention, the effect increases depending on the doped amount of Nb. Even if a subtle amount of Nb such as less than 0.03%, or less than 0.02%, or even when less than 0.01% is doped, the property of preventing coarse grains remarkably improves compared with the case where Nb is not doped. However, Nb doping causes degradation in machinability and cold forgeability, and degradation in carburizing properties.

In particular, if a doped amount of Nb is Nb: 0.04% or greater, the base material becomes hard, resulting in degradation in machinability and cold forgeability. Along with this, it becomes difficult to subject a steel bar/wire rod to solution treatment when the steel bar/wire rod is heated for rolling. For the above reasons, it is preferable that the content of Nb be within the range of less than 0.04%. A preferable range in the case where workability is of particular importance, such as machinability and cold forgeability is less than 0.03%. Furthermore, a preferable range in the case where carburizability as well as workability is of particular importance, is less than 0.02%. Moreover, a preferable range in the case where carburizability is of particular importance, is less than 0.01%. Furthermore, it is preferable that, for obtaining both of the property of preventing coarse grains and workability, a doped amount of Nb be adjusted according to a doped amount of Ti. For example, a preferable range of Ti+Nb is 0.07 to less than 0.17%. In particular, in high-temperature carburizing and in cold forged components, a desirable range is over 0.091% to less than 0.17%.

Next, in one aspect of the present invention, a structural fraction of bainite after hot rolling may be limited to 30% or less. Effects of such an aspect will be described below. An existence of bainite structure in the steel material after hot rolling causes production of coarse grains at the time of carburizing heating. Furthermore, suppression of existence of bainite is desirable in terms of improvement in cold workability. These adverse influences become particularly remarkable when the structural fraction of bainite exceeds 30%. For the above reason, it is preferable that the structural fraction of bainite after hot rolling be limited to 30% or less. In the case where carburizing conditions for preventing coarse grains are severe in high-temperature carburizing and the like, a preferable range is 20% or less. In the case where carburizing conditions for preventing coarse grains are more severe because the process goes through cold forging or the like, a preferable range is 10% or less.

Next, in one aspect of the present invention, the ferrite grain size index after hot rolling may be any of No. 8 to 11 that are defined in JIS G0552. Effects of such an aspect will be described below. If ferrite grains after hot rolling are excessively fined, austenite grains becomes excessively refined at the time of carburizing. If austenite grains are excessively refined, coarse grains are likely to be produced. In particular, if the ferrite grain size is over No. 11, this tendency becomes remarkable. Furthermore, if austenite grains are excessively fine so as to exceed No. 11 defined in JIS G0551, an undesirable effect such as insufficient strength due to degradation in hardenability is brought about, similarly to the steel material described in Patent Document 4. On the other hand, if the ferrite grains size number after hot rolling is less than No. 8 defined in JIS G0552, in which grains are coarser, ductility of the hot rolled material is degraded, and cold forgeability is degraded. For the above reason, it is preferable that the ferrite grain size index after hot rolling be within the range of No. 8 to 11 as defined in JIS G0552.

In one aspect of the present invention, in a cross-section in a longitudinal direction in a matrix of the steel after hot rolling, a maximum diameter of Ti-based precipitates may be 40 μm or less, measured by the extreme value statistics under conditions of an inspection reference area: 100 mm$^2$, the number of inspections: 16 fields of view, and an area for which a prediction is made: 30000 mm$^2$. Effects obtained by the method according to such an aspect will be described below. One of the requirement properties for a carburized component to which the present invention is directed is contact fatigue strength such as rolling contact fatigue property and surface fatigue property. If coarse Ti-based precipitates are present in steel, the coarse Ti-based precipitates function as starting points of contact fatigue fracture, resulting in degradation in fatigue property. If a maximum diameter of Ti-based precipitates by the extreme value statistics (measured under conditions of an inspection reference area: 100 mm$^2$, the number of inspections: 16 fields of view, and an area for which a prediction is performed: 30000 mm$^2$) exceeds 40 μm, an adverse influence of the Ti-based precipitates on the contact fatigue property becomes particularly remarkable. For the above reason, it is preferable that a maximum diameter of Ti-based precipitates by the extreme value statistics be 40 μm or less. A measurement and prediction method of a maximum diameter of precipitates by the extreme value statistics is based on a method described in, for example, Yukitaka MURAKAMI, "Metal Fatigue: Effect of Small Defects and Inclusions,"YOKENDO LTD., pp. 233-239 (1993). One used in the present invention is a two-dimensional inspection method of estimating a maximum precipitate observed in a predetermined area (an area for which a prediction is made: 30000 mm$^2$). A detailed measurement procedure will be described in the section of Examples later.

Next hot rolling conditions in a manufacturing method of a case hardening steel according to the present invention is described.

Steel according to the prevent invention composed of the aforementioned chemical components is molten by a typical method such as using a converter furnace or an electric furnace. The components of the steel are adjusted. Then, the steel goes through a forging step, and, if required, a cogging step, to be hot rolled into a wire rod or a steel bar. Thereby, a rolled base material is manufactured.

Next, in one aspect of the present invention, the rolled base material that has been manufactured may be heated at a temperature of 1150° C. or higher for a heat-retention time of 10 minutes or longer. In this case, as compared to a heating condition of less than 1150° C. or to a heating condition of 1150° C. or higher for less than 10 minutes, the abovementioned condition can more efficiently incorporate Ti-based precipitates, precipitates of Nb, and AlN into a matrix as solid solute. As a result, it is possible to finely precipitate a predetermined amount or more of Ti-based precipitates and precipitates of Nb in the steel material after hot rolling in an efficient manner in advance. This allows coarse Ti-based precipitates, precipitates of Nb, and AlN to be present in the steel after hot rolling, and thereby suppress production of coarse grains at the time of carburizing. Therefore, it is preferable that, in hot rolling, the rolled base material be heated at a temperature of 1150° C. or higher for a heat-retention time of 10 minutes or longer. A more preferable condition is a hot rolling temperature of 1180° C. or higher for a heat-retention time of 10 minutes or longer.

Next, in one aspect of the present invention, the base material may be gradually cooled after hot rolling at a rate of 1° C./second or slower in the range of 800 to 500° C. A cooling condition of over 1° C./second allows the base material to pass through the precipitation temperature range for Ti-based precipitates only for an insufficient period of time. Therefore, a precipitated amount of fine TiC precipitates after hot rolling becomes insufficient, and moreover, a structural fraction of bainite becomes larger. Consequently, it is not possible to suppress production of coarse grains at the time of carburizing. Furthermore, if the cooling rate is high, hardness of the rolling material increases, thus deteriorating cold forgeability. Therefore, it is desirable that a cooling rate be as low as possible. A preferable range of the cooling rate is 0.71° C./second or less. Note that, as a method of slowing down a cooling rate, a method of installing a heat-retention cover or a heat-retention cover with a heat source at a subsequent stage in the rolling line, and performing gradual cooling by use of the heat-retention cover, or another method may be used.

Next, in one aspect of the present invention, a finishing temperature of hot rolling may be 840 to 1000° C. At a finishing temperature of less than 840° C., a ferrite grain size becomes excessively fine, resulting in a production of coarse grains at the time of subsequent carburizing. On the other hand, at a finishing temperature of over 1000° C., hardness of the rolled material increases, deteriorating cold forgeability. For the above reason, it is preferable that a finishing temperature of hot rolling be 840 to 1000° C. In an application for cold forging, it is desirable that the finishing temperature be in the range of 840 to 920° C. for use without annealing, and be in the range of 920 to 1000° C. in other conditions.

In the present invention, conditions for the size of a cast piece, a cooling rate at the time of solidification, and togging are not particularly limited. So long as the requirements recited in the appended claims are satisfied, any condition may be used. The present invention is applicable to both of components manufactured through a cold forging step and to components manufactured through hot forging. Examples of hot forging steps include "steel bar, hot forging, heat treatment such as normalizing, if required, cutting, carburizing and quenching, polishing, if required." By use of a steel material of the present invention, for example a hot forging can be performed at a heating temperature of 1150° C. or higher, and subsequently, a normalizing treatment can be performed if required. Thereby, even in a sever carburizing and quenching heat treatment condition such as carburizing temperature range of 950° C. to 1090° C., it is still possible to suppress production of coarse grains, enabling to obtain an excellent material quality properties. As a result, for example in the case of bearing components and rolling components, an excellent rolling contact fatigue property is obtained even after performing high-temperature carburizing.

In the present invention, carburizing conditions are not particularly limited. In the case of aiming for a particularly high level of rolling contact fatigue life for bearing components and rolling components, a carbon potential at the time of carburizing may be set to a higher value in the range of 0.9 to 1.3% as described above, or a so-called carbonitriding treatment may be performed. The carbonitriding treatment is a treatment in which nitriding is performed in the process of the diffusion treatment after carburizing. In the case of performing this treatment, a condition such as to put the nitride concentration on the surface in the range of 0.2 to 0.6% is preferable. By using these conditions, fine Ti(CN) is precipitated in abundance in the carburized case and also 30 to 40% of the retained γ is introduced. This contributes to improvement in rolling life.

Note that the present invention includes a carburized component that uses the case hardening steel with the aforementioned construction and is machined into a component shape.

EXAMPLES

Example 1

Hereunder is a description of examples of the present invention.

Steel smelting in a converter furnace with a composition shown in Table 1 was subjected to a continuous casting, and was subjected to a cogging step if required, and prepared into a rolled base material which is 162 mm square. Subsequently, steel bars with 24 to 30 mm in diameter were manufactured by hot rolling.

Furthermore, a prediction of a maximum diameter of Ti-based precipitates by the extreme value statistics was made by the following method. Whether the precipitates were based on

TABLE 1

| Category | Steel No. | C | Si | Mn | P | S | Al | Ti | N | Cr | Mo | Ni | V | B | Nb | O |
|---|---|---|---|---|---|---|---|---|---|---|---|---|---|---|---|---|
| Comparative steel | 1 | 0.25 | 0.23 | 0.70 | 0.013 | 0.011 | 0.055 | 0.095 | 0.0040 | 1.06 | — | — | — | — | — | 0.0016 |
| Comparative steel | 2 | 0.21 | 0.25 | 0.82 | 0.010 | 0.015 | 0.089 | 0.151 | 0.0039 | 1.09 | — | — | — | — | 0.029 | 0.0018 |
| Inventive steel | 3 | 0.23 | 0.23 | 0.70 | 0.011 | 0.030 | 0.120 | 0.094 | 0.0037 | 1.07 | — | — | — | — | — | 0.0013 |
| Inventive steel | 4 | 0.24 | 0.21 | 0.74 | 0.015 | 0.014 | 0.150 | 0.120 | 0.0032 | 1.24 | 0.17 | — | — | — | — | 0.0013 |
| Inventive steel | 5 | 0.20 | 0.19 | 0.72 | 0.014 | 0.013 | 0.110 | 0.124 | 0.0036 | — | 0.19 | — | — | — | — | 0.0017 |
| Inventive steel | 6 | 0.20 | 0.19 | 0.83 | 0.013 | 0.014 | 0.198 | 0.059 | 0.0075 | 0.42 | — | — | — | — | — | 0.0013 |
| Comparative steel | 7 | 0.21 | 0.25 | 0.70 | 0.014 | 0.011 | 0.065 | 0.078 | 0.0034 | 1.23 | — | — | — | — | — | 0.0018 |
| Inventive steel | 8 | 0.21 | 0.21 | 0.79 | 0.012 | 0.014 | 0.124 | 0.060 | 0.0066 | 1.12 | — | — | — | — | — | 0.0013 |
| Inventive steel | 9 | 0.21 | 0.21 | 0.76 | 0.011 | 0.012 | 0.241 | 0.145 | 0.0035 | 1.06 | — | 1.75 | — | — | — | 0.0014 |
| Comparative steel | 10 | 0.25 | 0.22 | 0.78 | 0.015 | 0.015 | 0.103 | 0.142 | 0.0032 | 1.10 | — | — | 0.11 | — | — | 0.0010 |
| Comparative steel | 11 | 0.25 | 0.22 | 0.73 | 0.010 | 0.015 | 0.098 | 0.112 | 0.0034 | 1.07 | — | — | — | 0.0020 | — | 0.0015 |
| Comparative steel | 12 | 0.20 | 0.24 | 0.73 | 0.014 | 0.041 | 0.060 | 0.089 | 0.0031 | 1.17 | — | — | — | — | — | 0.0016 |
| Inventive steel | 13 | 0.20 | 0.24 | 0.71 | 0.015 | 0.058 | 0.118 | 0.099 | 0.0030 | 1.15 | — | — | — | — | — | 0.0010 |
| Inventive steel | 14 | 0.30 | 0.22 | 0.82 | 0.015 | 0.063 | 0.115 | 0.074 | 0.0034 | 1.17 | — | — | — | — | — | 0.0016 |
| Comparative steel | 15 | 0.40 | 0.25 | 0.78 | 0.013 | 0.080 | 0.104 | 0.089 | 0.0048 | 1.14 | — | — | — | — | — | 0.0010 |
| Comparative steel | 16 | 0.50 | 0.22 | 0.70 | 0.011 | 0.013 | 0.099 | 0.099 | 0.0042 | 1.04 | — | — | — | — | — | 0.0017 |
| Comparative steel | 17 | 0.60 | 0.21 | 0.79 | 0.014 | 0.011 | 0.098 | 0.102 | 0.0048 | 1.01 | — | — | — | — | — | 0.0016 |
| Comparative steel | 18 | 0.21 | 0.21 | 0.83 | 0.010 | 0.010 | 0.022 | 0.120 | 0.0046 | 1.18 | — | — | — | — | — | 0.0011 |
| Comparative steel | 19 | 0.21 | 0.20 | 0.80 | 0.013 | 0.014 | 0.201 | 0.135 | 0.0011 | 1.12 | — | — | — | — | — | 0.0010 |
| Comparative steel | 20 | 0.24 | 0.22 | 0.76 | 0.013 | 0.012 | 0.029 | 0.097 | 0.0041 | 1.04 | — | — | — | — | — | 0.0016 |
| Comparative steel | 21 | 0.21 | 0.22 | 0.77 | 0.013 | 0.011 | 0.042 | 0.089 | 0.0050 | 1.03 | — | — | — | — | — | 0.0018 |
| Comparative steel | 22 | 0.20 | 0.21 | 0.72 | 0.012 | 0.014 | 0.129 | 0.099 | 0.0043 | 1.18 | — | — | — | — | — | 0.0016 |
| Comparative steel | 23 | 0.21 | 0.19 | 0.79 | 0.013 | 0.013 | 0.034 | — | 0.0039 | 1.19 | — | — | — | — | — | 0.0010 |
| Comparative steel | 24 | 0.24 | 0.21 | 0.75 | 0.013 | 0.014 | 0.098 | — | 0.0034 | 1.09 | — | — | — | — | — | 0.0016 |
| Comparative steel | 25 | 0.24 | 0.20 | 0.73 | 0.011 | 0.015 | 0.135 | 0.253 | 0.0032 | 1.24 | — | — | — | — | — | 0.0010 |
| Comparative steel | 26 | 0.30 | 0.21 | 0.77 | 0.011 | 0.015 | 0.030 | 0.157 | 0.0048 | 1.25 | — | — | — | — | — | 0.0014 |
| Comparative steel | 27 | 0.40 | 0.23 | 0.77 | 0.014 | 0.011 | 0.009 | 0.167 | 0.0030 | 1.23 | — | — | — | — | — | 0.0010 |
| Comparative steel | 28 | 0.50 | 0.20 | 0.78 | 0.010 | 0.012 | 0.040 | 0.091 | 0.0039 | 1.23 | — | — | — | — | — | 0.0010 |
| Comparative steel | 29 | 0.60 | 0.21 | 0.72 | 0.013 | 0.012 | 0.025 | 0.092 | 0.0040 | 1.19 | — | — | — | — | — | 0.0016 |

In Table 1, each chemical component is shown in mass%.

In Table 1, each chemical component is shown in mass %.

Each steel bar after hot rolling was subjected to microscopic observation. Measurement of its bainite faction was performed, and its ferrite grain size was measured according to the standard of JIS G0552. Furthermore, its Vickers hardness was measured, which was used as an indicator for cold workability.

After spheroidizing annealing was performed on each steel bar manufactured in the above step, a test piece for upsetting was fabricated, which was subjected to upsetting with a rolling reduction of 50%. Subsequently, the test piece was subjected to a carburizing simulation. The condition for the carburizing simulation was heating to 910° C. to 1010° C. for five hours, and cooling by water. After that, the cut surface was subjected to polishing and corrosion. Then, particle sizes of the prior austenite were observed to find a coarse grain producing temperature (an austenite grain coarsening temperature). That is, a plurality of carburizing simulations were performed at different temperatures within the above range. In the case where a coarsening of grains was recognized in a test piece fabricated by the carburizing simulation at a specific temperature or higher, the temperature was regarded as a temperature at which coarse grains were produced. A carburizing treatment is typically performed in the temperature range of 930 to 950° C. Therefore, test pieces with coarse grain producing temperatures of 950° C. or lower were determined as being inferior in austenite grain coarsening properties. Note that measurement of the grain size of the prior austenite was performed in conformance with JIS G 0551. Approximately 10 fields of view were observed with a magnification of 400 times. With a presence of only one coarse grain with a grain size No. 5 or less, it was determined that coarse grains were produced.

Ti or not was determined based on a difference in contrast in an optical microscope. Adequacy of the determination method based on a difference in contrast has been verified by a scan-type electron microscope with an energy-dispersion-type X-ray spectroscopy analyzer. In a cross-section in the longitudinal direction of each test piece, a region with an inspection reference area 100 mm$^2$ (a region of 10 mm×10 mm) was prepared for 16 fields of view in advance. Then, a maximum Ti-based precipitate in each inspection reference area 100 mm$^2$ was detected, and was photographed with a magnification of 1000× by an optical microscope. This procedure was repeated 16 times for each of the 16 fields of view with an inspection reference area 100 mm$^2$ (that is, the number of inspections: 16 fields of view). In the obtained photographs, a diameter of the maximum precipitate in each inspection reference area was measured. In the case where the precipitate was elliptic, a geometric average of its major axis length and its minor axis length was determined, which was regarded as a diameter of the precipitate. The obtained 16 pieces of data on the maximum diameters were plotted on extreme probability paper by a method described in Yukitaka Murakami, "Metal Fatigue: Effect of Small Defects and Inclusions," YOKENDO LTD., pp. 233-239 (1993). Then, a distribution line for maximum precipitates (a linear function of maximum precipitate diameters and standardization variables in the extreme value statistics) was determined. By extrapolating the distribution line for maximum precipitates, the diameter of the maximum precipitate in the area for which the prediction is to be made (30000 mm$^2$) was predicted.

Furthermore, the steel bars with a diameter of 24 to 30 mm after hot rolling were subjected to heat treatments of normalizing and adjusting cooling. Thereby, all the steel bars were provided with a ferrite-pearlite structure. After this procedure, cylindrical test pieces with a diameter of 22 to 28 mm and a height of 21 mm were cut out and were subjected to milling cutter finish, which were used as test pieces for drill cutting (boring). A drill boring test was performed on the test pieces for drill cutting in the conditions shown in Table 2, and machinability of inventive steel and comparative steel was evaluated.

TABLE 2

| Cutting conditions | Drill | Others |
|---|---|---|
| Cutting speed 1-100 m/min | Drill diameter: φ3 mm | Hole depth: 9 mm |
| Feed: 0.25 mm/rev Cutting fluid: Emulsion | NACHI normal drill Protrusion: 45 mm | Tool life: Untill broken |

In Table 2, NACHI normal drill refers to SD3.0 model drill manufactured by NACHI-FUJIKOSHI CORP. The characteristics of this drill are described in, for example, Tool Handbook 2008, NACHI-FUJIKOSHI CORP. It is a universal drill with a diameter of 3.0 mm, a groove length of 42 mm, and a whole length of 71 mm.

In this evaluation, as an evaluation index, a maximum cutting speed of VL1000, which allows cutting up to a cumulative depth of 1000 mm, was adopted in the drill boring test.

Here, the index VL1000 indicative of a drill life refers to a maximum peripheral velocity of a drill in which drilling a hole up to a cumulative depth of 1000 mm is possible. The larger this value is, the higher the speed for cutting can be, and hence the superior in machinability. The procedure of evaluating VL1000, which is a maximum peripheral velocity for achieving a cumulative depth of 1000 mm, is as follows. Using different cutting speeds, a plurality of drill boring tests were performed in the conditions of Table 2, with a new NACHI normal drill used in every test. Then, it is observed whether the drill used in each test was broken or not. By repeating the above test, a maximum cutting speed that allows boring a hole of 1000 mm to stably finish without breaking the drill was determined, and VL1000 is defined to be this maximum cutting speed.

Next, rolling contact fatigue test pieces of a cylindrical shape with a diameter of 12.2 mm were fabricated from the steel materials that had been subjected to cold forging with a rolling reduction of 50%. The test pieces were subjected to carburizing under conditions of 950° C.×5 hours and a carbon potential of 0.8%. A quenching oil had a temperature of 130° C., and tempering was performed at 180° C.×2 hours. The austenite grain size in a carburized case was investigated on these carburized and quenched materials. Furthermore, a point-contact-type rolling contact fatigue test rig (Hertz maximum contact stress: 5884 MPa) was used to evaluate the rolling contact fatigue property. As a standard for fatigue life, an L10 life is used, which is defined as "the number of repetitions of stresses until fatigue fracture at a cumulative damage probability of 10% that is obtained by plotting the test results on Weibull probability paper."

These investigation results are arranged and shown in Table 3. Rolling contact fatigue life shows a relative value of the L10 life of each steel No. in the case where the L10 life of steel No. 23 of comparative steel is assumed to be 1.

TABLE 3

| Category | Steel No. | Hot rolling conditions | | | Structural fraction of bainite after hot rolling % | Ferrite grain size index after hot rolling | Maximum diameter of Ti-based precipitates by extreme statistics | Hardness after hot rolling HV | VL 1000 m/min |
|---|---|---|---|---|---|---|---|---|---|
| | | Heating temperature ° C. | Finishing temperature ° C. | Cooling temperature ° C./sec | | | | | |
| Comparative steel | 1 | 1200 | 920 | 0.60 | 0 | 9 | 22 | 186 | 43 |
| Comparative steel | 2 | 1210 | 940 | 0.58 | 0 | 10 | 18 | 165 | 42 |
| Inventive steel | 3 | 1260 | 930 | 0.48 | 0 | 9 | 36 | 164 | 50 |
| Inventive steel | 4 | 1230 | 920 | 0.46 | 0 | 8 | 39 | 170 | 43 |
| Inventive steel | 5 | 1220 | 900 | 0.52 | 0 | 9 | 23 | 161 | 40 |
| Inventive steel | 6 | 1150 | 930 | 0.51 | 0 | 9 | 39 | 158 | 45 |
| Comparative steel | 7 | 1160 | 930 | 0.55 | 0 | 8 | 28 | 200 | 42 |
| Inventive steel | 8 | 1170 | 940 | 0.47 | 0 | 9 | 38 | 200 | 42 |
| Inventive steel | 9 | 1220 | 940 | 0.62 | 15 | 9 | 39 | 179 | 40 |
| Comparative steel | 10 | 1240 | 940 | 0.55 | 0 | 9 | 29 | 180 | 45 |
| Comparative steel | 11 | 1240 | 900 | 0.61 | 5 | 8 | 27 | 168 | 45 |
| Comparative steel | 12 | 1220 | 930 | 0.59 | 0 | 9 | 21 | 162 | 43 |
| Inventive steel | 13 | 1210 | 920 | 0.58 | 0 | 9 | 30 | 160 | 62 |
| Inventive steel | 14 | 1170 | 910 | 0.48 | 0 | 9 | 34 | 182 | 44 |
| Comparative steel | 15 | 1170 | 900 | 0.49 | 0 | 8 | 24 | 244 | 40 |
| Comparative steel | 16 | 1180 | 910 | 0.52 | 0 | 9 | 38 | 235 | 38 |

TABLE 3-continued

| Category | | | | | | | | | |
|---|---|---|---|---|---|---|---|---|---|
| Comparative steel | 17 | 1170 | 940 | 0.55 | 0 | 9 | 28 | 232 | 36 |
| Comparative steel | 18 | 1180 | 910 | 0.55 | 0 | 8 | 25 | 203 | 28 |
| Comparative steel | 19 | 1200 | 930 | 0.51 | 0 | 9 | 59 | 164 | 42 |
| Comparative steel | 20 | 1190 | 930 | 0.62 | 5 | 9 | 24 | 185 | 31 |
| Comparative steel | 21 | 1240 | 900 | 0.58 | 0 | 8 | 31 | 179 | 30 |
| Comparative steel | 22 | 1240 | 900 | 1.30 | 39 | 9 | 38 | 179 | 45 |
| Comparative steel | 23 | 1220 | 900 | 0.51 | 0 | 9 | — | 201 | 50 |
| Comparative steel | 24 | 1230 | 930 | 0.49 | 0 | 8 | — | 167 | 45 |
| Comparative steel | 25 | 1220 | 910 | 0.55 | 0 | 9 | 39 | 188 | 27 |
| Comparative steel | 26 | 1220 | 910 | 0.56 | 0 | 9 | 27 | 182 | 29 |
| Comparative steel | 27 | 1210 | 900 | 0.51 | 0 | 8 | 26 | 245 | 28 |
| Comparative steel | 28 | 1230 | 920 | 0.57 | 0 | 9 | 21 | 242 | 25 |
| Comparative steel | 29 | 1190 | 930 | 0.52 | 0 | 9 | 22 | 285 | 22 |

| | | | [Example 1] Cold process | | | [Example 2] Hot process | | |
|---|---|---|---|---|---|---|---|---|
| | | | 950° C. carburized steel | | | 1050° C. carburized steel | | |
| Category | Steel No. | Carburizing simulation Austenite grain coarsening temperature ° C. | Austenite grain size index | Rolling contact fatigue life (relative value) | Impact value (J/cm$^2$) | Carburizing simulation Austenite grain coarsening temperature ° C. | Austenite grain size index | Rolling contact fatigue life (relative value) | Impact value (J/cm$^2$) |
| Comparative steel | 1 | 1010 | 9 | 3.0 | 13 | >1010 | 8 | 4.0 | 12 |
| Comparative steel | 2 | >1010 | 11 | 3.2 | 15 | >1010 | 10 | 4.9 | 14 |
| Inventive steel | 3 | >1010 | 10 | 3.5 | 13 | >1010 | 9 | 3.2 | 12 |
| Inventive steel | 4 | 1010 | 9 | 3.0 | 14 | >1010 | 8 | 3.0 | 14 |
| Inventive steel | 5 | 1010 | 10 | 3.6 | 12 | >1010 | 9 | 4.6 | 11 |
| Inventive steel | 6 | 990 | 9 | 3.3 | 12 | >1010 | 8 | 2.5 | 12 |
| Comparative steel | 7 | 990 | 9 | 4.2 | 12 | >1010 | 8 | 3.4 | 11 |
| Inventive steel | 8 | 990 | 9 | 4.6 | 12 | >1010 | 8 | 4.7 | 12 |
| Inventive steel | 9 | 1010 | 9 | 3.4 | 13 | >1010 | 9 | 5.2 | 12 |
| Comparative steel | 10 | 1010 | 9 | 3.9 | 14 | >1010 | 8 | 3.1 | 14 |
| Comparative steel | 11 | >1010 | 10 | 4.9 | 12 | >1010 | 9 | 2.7 | 11 |
| Comparative steel | 12 | 1010 | 10 | 4.2 | 13 | >1010 | 9 | 3.8 | 12 |
| Inventive steel | 13 | 1010 | 9 | 4.9 | 13 | >1010 | 8 | 5.2 | 11 |
| Inventive steel | 14 | 990 | 9 | 2.8 | 13 | >1010 | 8 | 4.2 | 13 |
| Comparative steel | 15 | 990 | 9 | 2.7 | 14 | >1010 | 8 | 4.4 | 13 |
| Comparative steel | 16 | 1010 | 9 | 4.9 | 12 | >1010 | 9 | 2.5 | 12 |
| Comparative steel | 17 | 990 | 9 | 3.8 | 12 | >1010 | 8 | 4.3 | 12 |
| Comparative steel | 18 | 990 | 9 | 3.7 | 13 | >1010 | 9 | 4.1 | 13 |
| Comparative steel | 19 | 930 | 2 | 0.1 | 11 | 1010 | 1 | 0.1 | 11 |
| Comparative steel | 20 | 1010 | 10 | 4.5 | 15 | >1010 | 9 | 5.0 | 13 |
| Comparative steel | 21 | >1010 | 9 | 3.8 | 13 | >1010 | 8 | 2.9 | 13 |

TABLE 3-continued

| | | | | | | | | | |
|---|---|---|---|---|---|---|---|---|---|
| Comparative steel | 22 | <910 | 2 | 1.5 | 15 | 970 | 1 | 4.6 | 14 |
| Comparative steel | 23 | <910 | 2 | 1.0 | 10 | 970 | 1 | 1.0 | 7 |
| Comparative steel | 24 | <910 | 3 | 2.2 | 10 | 990 | 2 | 1.3 | 8 |
| Comparative steel | 25 | 970 | 2 | 1.8 | 14 | 1010 | 1 | 1.9 | 14 |
| Comparative steel | 26 | 1010 | 9 | 1.7 | 12 | >1010 | 8 | 3.3 | 12 |
| Comparative steel | 27 | 1010 | 9 | 3.1 | 13 | >1010 | 8 | 4.4 | 12 |
| Comparative steel | 28 | 1010 | 9 | 3.1 | 11 | >1010 | 9 | 4.9 | 11 |
| Comparative steel | 29 | 1010 | 9 | 1.9 | 13 | >1010 | 9 | 5.0 | 12 |

As for the inventive steel, austenite grain coarsening temperatures are 990° C. or higher. The γ grains of 950° C. carburized steel are fine rounded grains. Therefore, it is evident that they are excellent also in rolling contact fatigue property. Furthermore, the machinability evaluated by VL1000, which is an indicator for machinability, is 36 m/minute or greater for all the inventive examples, and hence favorable. Therefore, it is evident that they are excellent in machinability.

On the other hand, as for Nos. 18, 20, 21, 26, 27, 28, and 29 of the comparative steel, the Al amount is out of the range of the present invention. Furthermore, machinability is degraded, and VL1000 for each is 31 m/minute or less. As for No. 19 of the comparative steel, the N amount is outside the definition of the present application. Therefore, the maximum size of the Ti-based inclusions is large, that is, 59 μm against 40 μm of the inventive examples. The rolling contact fatigue life is short, and the austenite grain coarsening temperature is low. As for No. 22 of the comparative steel, the components are within the range defined in the present application. However, the cooling rate after hot rolling is high. Therefore, the structural fraction of bainite after hot rolling is beyond the range defined in the present application, and hence, the coarse grain property was poor. As for Nos. 23 and 24 of the comparative steel, the Ti amounts were below the range of the present invention. In addition to a poor coarse grain property, the impact values were low. Furthermore, as for No. 25 of the comparative steel, the Ti amount was beyond the range of the present invention. In addition to a poor coarse grain property, machinability was degraded.

Example 2

From a part of the rolled base material, used in Example 1, which was 162 mm square with the composition shown in Table 1, steel bars with a diameter of 70 mm were manufactured by hot rolling. With the steel bars used as base materials, hot forging was performed to finish the steel bars into hot forged members with a diameter of 40 mm. The heating temperatures for the hot forging were 1100° C. to 1290° C.

The hot forged members manufactured in the aforementioned step were subjected to a normalizing treatment in the condition of heating at 900° C.×1 hour and air-cooling. After that, a carburizing simulation was performed in the condition of heating for 5 hours, and an austenite coarse grain producing temperature was found, in the similar manner with Example 1.

Figure 1:
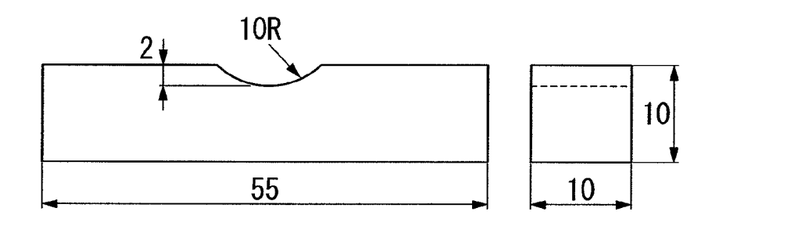
FIG. 1 is a diagram showing a Charpy impact test specimen.

Furthermore, after the above hot forged member was normalized, a rolling contact fatigue test piece with a diameter of 12.2 mm and a Charpy impact test specimen with a 10R-notch as shown in FIG. 1 were fabricated, and were carburized and quenched in the conditions of 1050° C.×1 hour and a carbon potential of 1.0%. A quenching oil had a temperature of 130° C., and tempering was performed at 180° C.×2 hours. A rolling contact fatigue life test was performed in the conditions similar to those of Example 1. The Charpy impact test was performed at room temperature, and the results were sorted by absorbed energy.

These investigation results are arranged and shown in Table 3. Rolling contact fatigue life shows a relative value of the L10 life of each material assuming the L10 life of No. 23 of the comparative steel to be 1.

As shown in Table 3, as for all the inventive steel, the austenite grain coarsening temperature was over 1010° C.

Furthermore, their γ grains of the 1050° C. carburized steel were fine grains of No. 8 or greater. Their rolling contact fatigue lives were favorable compared with those of the comparative steel.

On the other hand, the comparative steel was deviated from the range of the requirements of the present invention, similarly to Example 1. As is seen from the evaluation results for VL1000, which is an indicator of machinability, some of them were inferior in machinability, or inferior in property of preventing coarse grains Therefore, also in rolling contact fatigue property, they were lower than the inventive examples.

INDUSTRIAL APPLICABILITY

According to the case hardening steel, the carburized component, and the manufacturing method of a case hardening steel as set forth in the present invention, even if a component is manufactured in a cold forging step, coarsening of the grains at the time of carburizing is suppressed. Therefore, it is possible to improve a fatigue strength property. In addition to this, it is possible to make the degradation in dimensional accuracy by quenching distortion extremely less compared with the conventional cases. This enables cold forging of components which have had difficulty in being cold forged due to the problem of coarse grains, and also enables omission of annealing after cold forging. Furthermore, even if the present steel material is applied to components manufactured through a hot forging step, it is possible to prevent production of coarse grains also in high-temperature carburizing, to thereby obtain sufficient strength properties such as a rolling contact fatigue property. Furthermore, also as for cutting workability, a favorable machinability can be exerted with a case hardening steel according to the present invention, and hence, it is possible to obtain favorable cutting workability.

What is claimed is:

1. A case hardening steel wherein a chemical composition of the case hardening steel consists of, by mass %:
C: 0.1 to 0.6%;
Si: 0.02 to 1.5%;
Mn: 0.3 to 1.8%;
P: 0.025% or less;
S: 0.001 to 0.15%;
Al: over 0.05 to 1.0%;
Ti: 0.059 to 0.2%;
N: 0.01% or less;
O: 0.0025% or less, and
one or more of Cr: 0.4 to 2.0%, Mo: 0.02 to 1.5%, Ni: 0.1 to 3.5%, V: 0.02 to 0.5%, and B: 0.0002 to 0.005%, and
the balance consisting of iron and unavoidable impurities,
wherein a structure of the case hardening steel is a hot-rolled structure,
wherein in the hot-rolled structure,
a structural fraction of a bainite is 30% or less,
a ferrite grain size index is any of Nos. 8 to 11 defined in JIS G0552 dated 1998, and
a maximum diameter of Ti-based precipitates in a cross-section along longitudinal direction in a matrix of the steel is 40 μm or less.

2. A carburized component including the case hardening steel according to claim 1, which is worked into a component shape.

3. A manufacturing method of a case hardening steel, comprising:
preparing a steel whose chemical composition consists of, by mass %:
C: 0.1 to 0.6%;
Si: 0.02 to 1.5%;
Mn: 0.3 to 1.8%;
P: 0.025% or less;
S: 0.001 to 0.15%;
Al: over 0.05 to 1.0%;
Ti: 0.05 to 0.2%;
N: 0.01% or less;
O: 0.0025% or less, and
one or more of Cr: 0.4 to 2.0%, Mo: 0.02 to 1.5%, Ni: 0.1 to 3.5%, V: 0.02 to 0.5%, and B: 0.0002 to 0.005%, and
the balance consisting of iron and unavoidable impurities; and
heating the steel at a temperature of 1150° C. or higher for 10 minutes or longer and hot-rolling the steel into a wire rod or a steel bar,
gradually cooling the steel in a temperature range of 800 to 500° C. at a cooling rate of 1° C./second or less,
hot-rolling the steel at a finishing temperature of hot rolling is 840 to 1000° C.,
wherein a structural fraction of a bainite of the steel after hot rolling is 30% or less, and
a ferrite grain size index of the steel is any of No. 8 to 11 defined in JIS G0552 dated 1998 and a maximum diameter of Ti-based precipitates in a cross-section along longitudinal direction in a matrix of the steel is 40 μm or less.

* * * * *